United States Patent Office 2,955,850
Patented Oct. 11, 1960

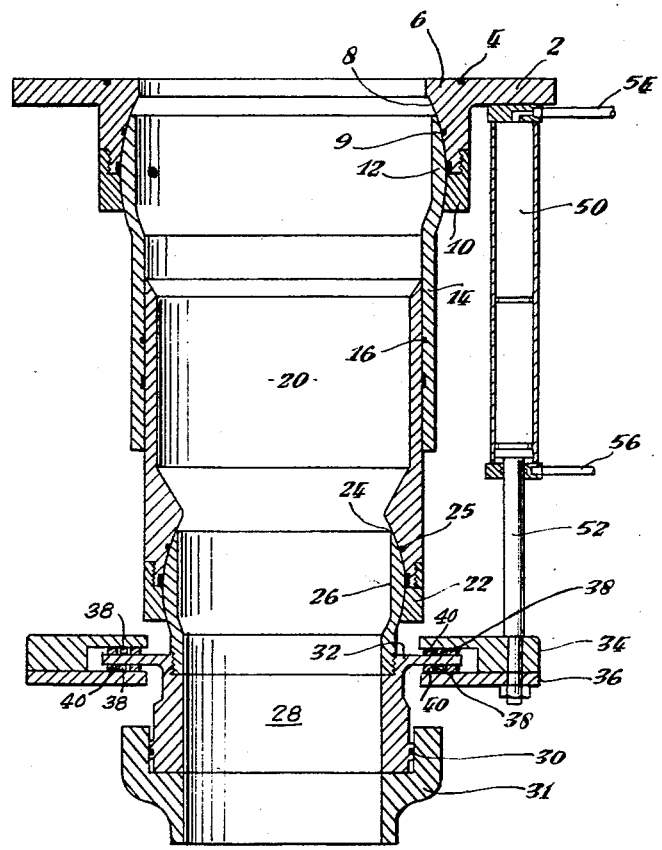

2,955,850
PIPE COUPLING HAVING TELESCOPIC AND LATERAL COMPENSATING MEANS

Ronald Bellinger, Bristol, England, assignor to Strachan & Henshaw Limited, Bristol, England, a company of Great Britain and Northern Ireland Filed Nov. 13, 1957, Ser. No. 696,223

Claims priority, application Great Britain Nov. 15, 1956

4 Claims. (Cl. 285—18)

This invention relates to couplings and in particular to a coupling for joining together two pressurised vessels. The problem which the present invention seeks to solve is to provide a coupling for use between two heavy pressurised vessels the relative position of which is liable to change whilst the two are coupled and also to make coupling and uncoupling possible if the passages of the two vessels which are to be coupled are not in line or spaced apart at a standard distance.

According to the present invention we provide a coupling for coupling together two pressurised vessels comprising end members for coupling to each vessel respectively and an interposed telescopic member having a universal joint at or adjacent to each end. Lifting means may be connected between the end members for closing said telescopic member when it is desired to disconnect the two vessels. In order to provide for lateral movement of one member relative to the other, the connection of the lifting means to one of the members may incorporate means giving relative lateral movement.

Referring to the drawing filed herewith which shows one form of coupling designed for joining a pressurised charge machine to the pressure vessel of a heterogeneous nuclear reactor, In the form illustrated the coupling comprises an upper flange 2 adapted to be bolted to the lower face of a charge machine, the top face being grooved to house an O ring 4. A downwardly depending skirt 6 of the flange 2 has a partly spherical inner surface 8 provided with an O-ring groove 9 and carries a retaining ring 10 the inner surface of which is a continuation of the spherical surface 8, the two parts being threaded to engage one another, the joint being formed on a diametrical plane of the sphere. Mounted within the spherical surface of the skirt 6 and retaining ring 10 is the upper spherical end 12 of a tubular member 14. The inner surface of the parallel lower portion of the tubular member 14 is grooved to receive an O-ring 16. Slidably mounted so as to telescope within the parallel lower portion of the tubular member 14 is a second tubular member 20 the lower end of which is formed in the same way as the skirt 6 and provided with a screwed-on ring 22 so as to provide a concave part spherical surface 24 grooved to receive an O-ring 25. Positioned in the said spherical surface 24 is a matching convex part spherical head of a short tube 26 which is screwed into the lower flanged tube 28 fitted with an O-ring 30. The flanged tube 28 is adapted to fit within the mouth of the charge tube 31 which is recessed to limit the depth of engagement of the tube 28 and to seal with the O-ring 30 thereon. The flange 32 of the tube 28 is clamped between two annular plates 34 and 36 with the interposition of balls 38 carried in a retaining ring 40 which thus allow a free sliding movement of the flange 32 between the plates 34 and 36. Coupled between the flange 2 and the plate 34 are three fluid operated piston and cylinder combinations, the cylinders 50 being mounted on the flange 2 and piston rods 52 being secured in the ring 34. Fluid pipes 54 and 56 are coupled via a valve box (not shown) to a source of fluid pressure. The difference in area between parts of the telescopic joint formed by the tube 14 and the lower flanged tube 28 ensures that the tube 28 will remain seated within the top of the charge tube 31.

What I claim and desire to secure by Letters Patent is:

1. A tubular coupling comprising opposite, end-connection members, a telescopic member universally coupled between said end-connection members, and means, operatively coupled between the end members in non-tiltable relation thereto, for telescoping said telescopic member to vary the length of the coupling, one of said end members, where coupled to said means, being shiftable relatively to said means to permit relative transverse movement between the end-connection members.

2. A coupling according to claim 1, in which the shiftable end member is slidably coupled to the telescoping means.

3. A coupling according to claim 2, in which the shiftable end member is provided with a flange, and the telescoping means, where coupled to said end member, is provided with a pair of spaced annular plates, the flange being slidably received between said plates.

4. A coupling according to claim 3, in which balls carried in a retaining ring are interposed between the flange and each annular plate.

References Cited in the file of this patent
UNITED STATES PATENTS

| | | |
|---|---|---|
| 391,336 | Potter | Oct. 16, 1888 |
| 1,963,286 | Ballert | June 19, 1934 |
| 2,776,168 | Schweda | Jan. 1, 1957 |